United States Patent
Hinegardner et al.

(10) Patent No.: US 11,016,964 B1
(45) Date of Patent: May 25, 2021

(54) INTENT DETERMINATIONS FOR CONTENT SEARCH

(71) Applicant: Amazon Technologies, Inc., Reno, NV (US)

(72) Inventors: Lisa Jane Hinegardner, Issaquah, WA (US); Andrew Dennis Hamel, Seattle, WA (US); Srikanth Thirumalai, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 268 days.

(21) Appl. No.: 15/702,393

(22) Filed: Sep. 12, 2017

(51) Int. Cl.
*G06F 16/242* (2019.01)
*G06F 16/248* (2019.01)
*G06F 16/2457* (2019.01)

(52) U.S. Cl.
CPC ........ *G06F 16/2428* (2019.01); *G06F 16/248* (2019.01); *G06F 16/2457* (2019.01)

(58) Field of Classification Search
CPC . G06F 16/2428; G06F 16/2457; G06F 16/248
See application file for complete search history.

(56) References Cited

U.S. PATENT DOCUMENTS

| | | | | |
|---|---|---|---|---|
| 5,265,014 A * | 11/1993 | Haddock | ............ | G06F 16/2428 704/9 |
| 7,366,721 B1 * | 4/2008 | Bennett | ................. | G06Q 30/02 711/206 |
| 7,761,464 B2 * | 7/2010 | Radlinski | ............ | G06F 16/9535 707/769 |
| 9,043,319 B1 * | 5/2015 | Burns | ............... | G06F 16/24578 707/725 |
| 2013/0145272 A1 * | 6/2013 | Boggie | ................... | G06F 3/167 715/728 |
| 2018/0089316 A1 * | 3/2018 | Ganot | ................. | G06F 16/3344 |

FOREIGN PATENT DOCUMENTS

WO     WO-2012024580 A1 *   2/2012   ......... G06Q 30/0275

OTHER PUBLICATIONS

Robo Bill Cunningham: Shazam for Fashion With Deep Neural Networks, Feb., pp. 1-17 (Year: 2016).*

* cited by examiner

*Primary Examiner* — Albert M Phillips, III
(74) *Attorney, Agent, or Firm* — Hogan Lovells US LLP (57) ABSTRACT

The selection of search results to display can be based at least in part upon an intent determined for a search query. Various intent terms can be used to specify intent or context for a search query in order to obtain a certain type of result. The intent terms can be suggested or provided to a user in such a way as to train the user as to their existence and usage. A submitted search query is analyzed to detect the intent term and determine the overall intent of the query. One or more targeted intent queries are executed against determined data sources to obtain results relevant to that intent, such as new content items for a particular topic or items that are similar to those offered by a particular store. A diverse assortment of results can then be presented to the user.

20 Claims, 9 Drawing Sheets

302 → dresses FOR me →

304 → Can we ask you some basic questions about your dress preferences to help us get started?

YES | NO

322 → What is your typical dress size?

8 Submit

342 → Which designer/brand reflects your personal style? (select all that apply)
☐ McCartney Louboutin
■ StageCoach
☐ New Army
☐ ACME    Submit

362 → Where do you learn about the latest fashion trends? (select all that apply)
■ Advertising
☐ Fashion News
☐ Browsing products
■ Word of mouth    Submit

INTENT DETERMINATIONS FOR CONTENT SEARCH

BACKGROUND

Users are increasingly utilizing electronic devices to research, locate, and obtain various types of information. For example, users may utilize a search engine to locate content related to specific topics or items of interest. In order to locate the content, users often submit keyword-based queries that relate to the topics or items of interest. In many instances, however, it is difficult to determine the reason for the selection of specific keywords or the logic behind the query, such that the returned search results may not be as accurate as desired. More complex queries can be entered to try to obtain more accurate results, but it can be difficult for users to learn, and remember, these complex query constructs.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to determining content to provide to a user. In particular, various embodiments determine the selection and/or ranking of items to display to a user based at least in part upon a determined intent associated with a search query. Various intent terms can be used to enable a user to specify intent or context for a search query in order to obtain a certain type of result. The intent terms can be suggested or provided to the user in such a way as to train the user as to their existence and usage. Once submitted, a search query can be analyzed to detect the intent term and determine the overall intent of the query. A corresponding function or process can be determined based at least in part upon the type of intent, to determine one or more tasks to be performed for the query. In some embodiments, one or more targeted intent queries are executed against one or more data sources to obtain results relevant to that intent, such as new content items for a particular topic or items that are similar to those offered by a particular store. A diverse assortment of results can then be presented to the user, along with potentially other intent terms or queries that enable quick and easy refinement of the determined search results.

Various other functions and advantages are described and suggested below as may be provided in accordance with the various embodiments.

Figure 1A:
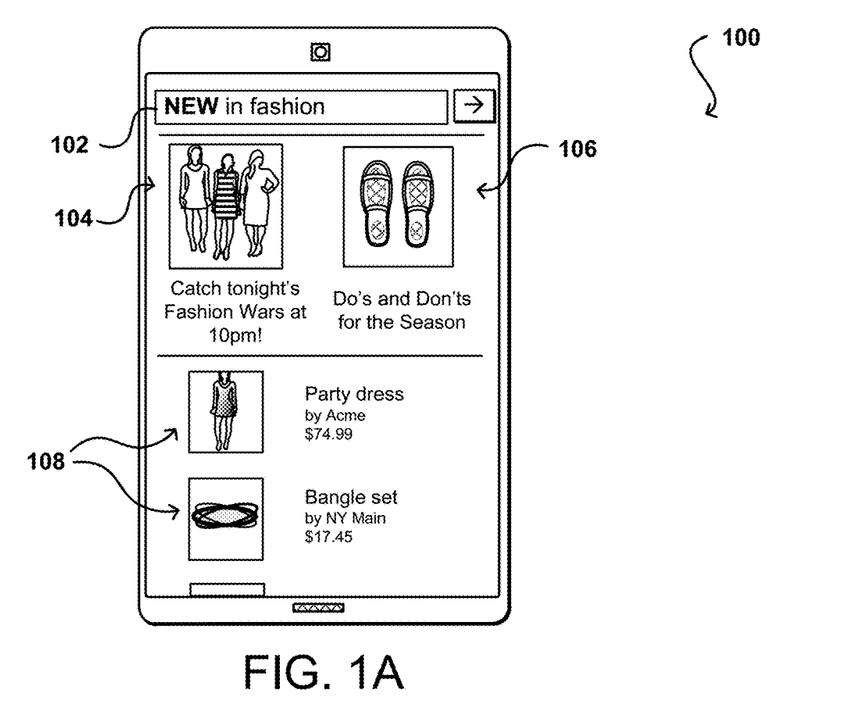
FIGS. 1A and 1B illustrate examples displays of content that can be obtained using intent queries in accordance with various embodiments.

FIG. 1A illustrates a first example display 100 of content that can be provided in accordance with various embodiments. In this example, a user has entered search query 102 into a search box of a user interface, such as a webpage displayed through a browser application or an interface page of a mobile app, among other such options. Although a portable computing device (e.g., a smart phone, an electronic book reader, or tablet computer) is shown, it should be understood that any device capable of receiving and processing input can be used in accordance with various embodiments discussed herein. Such devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, a user has entered one or more keywords which have resulted, directly or indirectly, in a query that includes an intent term. As discussed in more detail elsewhere herein, this may be the result of the user typing in the intent term, selecting the intent term, or having the intent term suggested or recognized, among other such options. An intent term is a term that is not meant to be treated as a typical search keyword, but is to be used to determine a purpose, scope, or context (i.e., an "intent" of the query) of a query that may be modified by the inclusion of a keyword or target, among other such options. In at least some embodiments, an intent term corresponds to a function, script, or process to be executed in response to the intent term. This can include, for example, determining a set of source-specific intent queries to obtain information determined to be relevant for the type of intent. As an example, the standard keyword "new" would be used to locate relevant items containing the word "new" in the description or title, for example, while the intent "NEW" may correspond to a function configured (i.e., through executable code) to identify recent content, or to otherwise indicate to find content that has been made available recently, where the relevant time period may depend at least in part upon the other keywords or elements of the query, which might help to define a type of content. The relevant time period can also be configurable by the user (i.e., the user defines within the function) or "learned" based on implicit or explicit feedback received from the user. The query can be submitted against a search index or other such data source for purposes of locating one or more matching search results, using any of a number of different search approaches known or used for such purposes. General approaches for executing a search query to locate a set of search results determined to be at least somewhat relevant to the query are well known in the art and, as such, will not be discussed herein in detail.

In the example of FIG. 1A, however, the query is not a simple string of keywords but includes a pattern of terms that implies or conveys intent. As used herein, this query implies intent by inclusion of an intent term, here the word "new," which is in all capital letters or follows another such pattern. The intent term can be further distinguished through bold, italics, or colored font, among other such options. The intent term in this case also includes a target, here the keyword "fashion." This is to be interpreted as the user looking for new information that is related to fashion. In this example the full query is "NEW in fashion," which can be interpreted to have the intent of obtaining content that is new and relates to the target concept of fashion. Various other intent patterns and types of queries or search criteria can be used as well within the scope of the various embodiments. The user may or may not have typed "NEW" in all capital letters, but the word may have been set to all capital letters once recognized as an intent term. In some embodiments, a user might type a term such as "new" and then have the option of the term being converted to all caps and interpreted as an intent term as discussed elsewhere herein.

As illustrated, the search query with the intent and target can be used to search for relevant content from one or more content sources, such as search indexes for various data repositories or sources. In this example multiple types of search results or suggestions are displayed. A first content item 104 relates to a television show that is appearing later that day which relates to fashion. The item can include a link to more information, an option to record or set a reminder for the content, etc. A second displayed content item 106 links to a recent article relating to fashion, or article relating to a recent or current fashion topic. The first and second content items can come from the same source or different sources. A third type of content item 108 relates to fashion items that are offered for consumption, through at least one electronic marketplace or other such source. Various other types of content can be presented as well within the scope of the various embodiments. Using such an approach, the user can obtain information about what is new in the world of fashion from various sources and with various types of content. Using conventional approaches, the user would have had to either search for fashion items using several different resources, or provide a very specific query as to the type of information that the user wanted to receive. Using intent terms and intent-based queries, however, a user can more quickly locate content that is of interest to the user and relevant to the user's intent. Such an approach can also help the computing system operate better (e.g., reduces computing resources needed to determine relevant content).

Figure 1B:
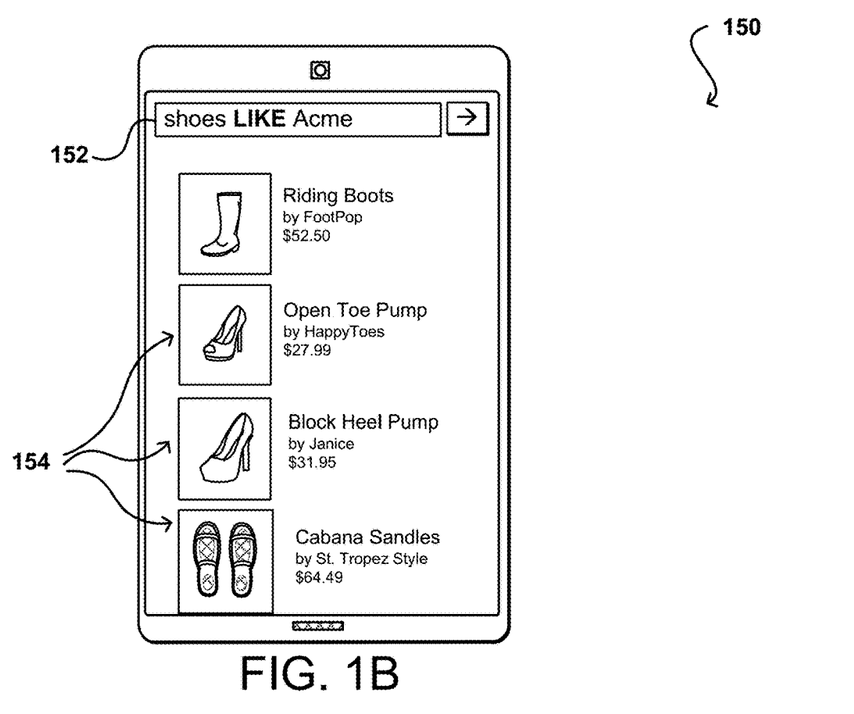
Figure 2A:
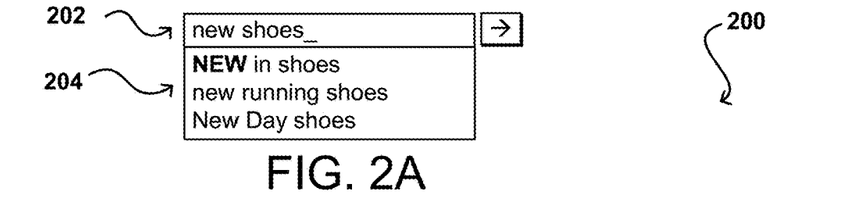
FIGS. 2A, 2B, 2C, 2D, 2E, and 2F illustrate example approaches for enabling users to learn and use intent terms in search queries that can be utilized in accordance with various embodiments.

FIG. 1B illustrates another example display 150 of content that can be provided in accordance with various embodiments. In this example, a user has again entered a search query 152 into a search box of a user interface. This query also includes an intent term, in this example the intent term "LIKE" that relates to the target "Acme." The intent term can be entered or selected using approaches such as those discussed previously with respect to FIG. 1A. Here, the intent is to obtain content about items that are like those offered by, or associated with, a specific target. The target in this example is Acme, which is a store or provider offering various items. As known, different stores offer items of different styles, at different price points, and targeted to different or specific types of consumers. Thus, a customer might be interested in viewing items that are similar to those that would be offered by a specific store or boutique, such as Acme. The user may include keywords, categories, or other modifiers that narrow the types of content in which the user has an interest. In this example, the user is interested in shoes that are "like" those that are available from the Acme store, retailer, or manufacturer. This can refer to shoes of a similar style, shape, color, type, or price that are aimed toward a similar type or set of consumers, among other such options. The search results can then present content 154 for items that are determined to be like those offered by Acme. The relevance of the items to Acme items can be determined in a number of different ways, such as by users indicating such similarity or by comparing available items to items offered by Acme using various comparison criteria or algorithms, etc. It would be difficult to specify through a conventional query how to obtain content for items that are similar to those offered by, or available from, a specific source, but an intent query can enable such information to be quickly and easily obtained using an intent term or pattern that is user friendly to learn and remember There can be various ways in which intent terms are surfaced to users, enabling users to learn of the availability of the terms, the types of terms available, and the types of content that can be returned in response to those queries. FIG. 2A illustrates one such example 200 wherein a user can enter a search query 202 such as "new shoes." During or after the entry, a set of one or more auto-complete or other search suggestions 204 can be presented as selectable options. A user can then select to use the entered query, continue typing additional query terms or characters, or select one of the suggested queries, among other such options. As illustrated, the types of suggested queries can vary based upon the entered query terms. One example query suggestion is "new running shoes," which can use information known about the user (such as past purchases, a current browse category, or other searches for a session) to suggest a completion or alternative query to help the user obtain the results of interest. Another similar query involves "New Day shoes," where "New Day" is a brand that includes one of the query terms. Also listed is a query with the "NEW" intent term. The user can view the query and determine that "NEW in shoes" will likely present information about new shoe-related content. If the user selects that query, the user can learn from the type of results provided how the intent query works. Further, the presentation of the intent term "NEW" in all capital letters, or bolded or colored font as discussed elsewhere herein, can help to teach the user about intent terms, as well as their use and effect. Such an approach can help to make the user aware of intent terms, and teach the user how to use the terms to get the desired results.

Figure 2B:
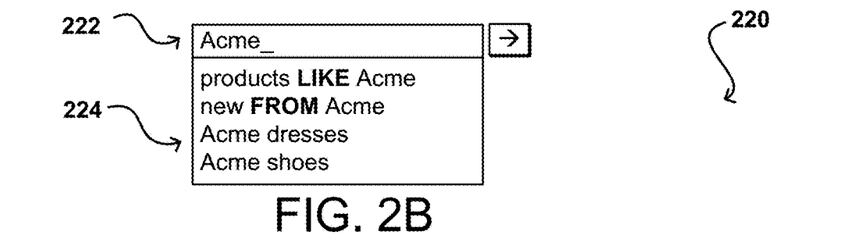

FIG. 2B illustrates another example 220 wherein a user has entered a keyword into a search box. In this example, the keyword 222 corresponds to a store, brand, manufacturer, provider, or other source of items or item content. Based on information about the user, such as past purchase history or interest, or other information such as popularity, search suggestions for specific items associated with that keyword can be provided, such as "Acme dresses" or "Acme shoes" which may be able to help a user more quickly complete a query, or can suggest to a user various categories or types of items that may be of interest. The query suggestions can also include queries with different types of intents, to help the user find the desired content but also to teach the user about different types of intents and intent terms that are available and/or understood. In this example, an intent "LIKE" can be used to obtain content for items that are like those obtainable from Acme. As mentioned, these can include items with a similar style, price point, or target customer as those offered by Acme. Similarly, another intent "FROM" can be used to obtain information for products offered by Acme that are newly available. Thus, such an approach can help to teach the different types of intents, and variations of intent formats, that are available.

It should also be noted that the word "new" appears in both the examples of FIGS. 2A and 2B, but is only shown as an intent in FIG. 2A. Thus, words can be used as an intent, target, modifier, or other purpose based upon context or usage in various embodiments. A user might also specify intent through the way in which the terms are presented or selected. For example, the query "NEW from Acme" could specify that the most important factor is for new content, with a preference that the new content be from Acme or equivalent. The query "new FROM Acme" could present a slightly different intent, in that the user is interested in items or content from Acme, and would prefer to see more recent examples of this content. Thus, the results for the second query might all come from Acme but not necessarily be as recent, while for the first query the content might all be recent but not necessarily all from Acme. A user could alternatively submit the query "NEW FROM Acme" to indicate that both new and being from Acme are important. Similarly, a user could instead submit a query such as "NEW Acme" which might return a superset of all the above results, and other relevant content.

Figure 2C:
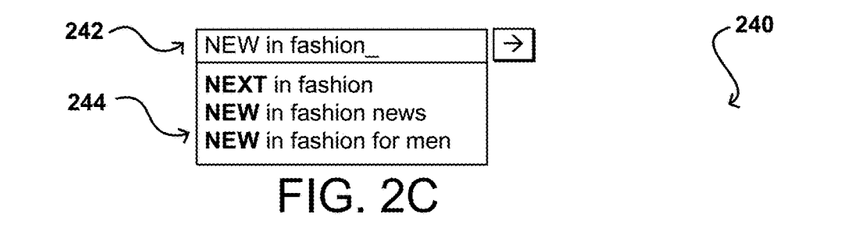
Figure 2D:
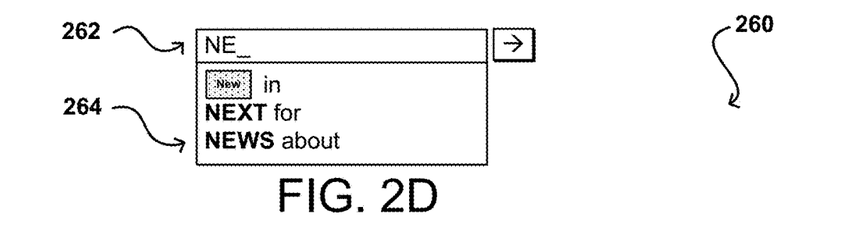
Figure 2E:
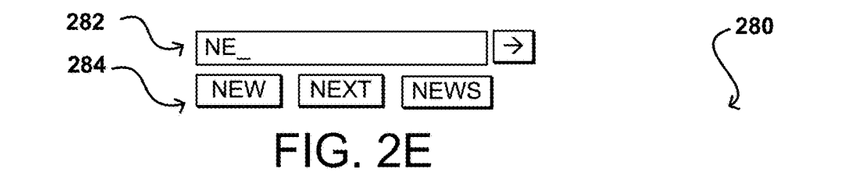

FIG. 2C illustrates another example 240 wherein a user has entered a query 242 with an intent and the system is attempting to provide alternatives or completion suggestions 244. Here, the user has entered the query "NEW in fashion" and might get auto-complete suggestions such as "NEW in fashion news" or "NEW in fashion for men." The system might also attempt to teach the user about other intents that might be of interest. In this example the user is looking for content that is "NEW" in fashion, which can talk about today's current styles, as well as potentially future plans or trends in fashion. One suggestion here provides the query "NEXT in fashion" which includes the intent "NEXT" instead of "NEW." The intent here would be slightly different, and would be interested only in upcoming trends and less in the current trends and styles. In this way, a user may be able to obtain content that is more relevant to the user's interest while learning additional intents that are available. FIGS. 2D and 2E illustrate other examples of approaches for teaching new intents to users that can be utilized in accordance with various embodiments. In the example 260 of FIG. 2D, a user has started typing in an intent 262 and there are various intents 264 provided as suggestions. As discussed elsewhere herein, intent terms can be displayed in various forms, including different fonts, colors, and the like. Intent terms can also be represented by graphics, animations, or other visual content, such as may include an emoji or other such visual representation, such as a gold metal emoji for a BEST intent term. In some embodiments a user can also enter or paste an emoji (or other visual representation) into the search box as a way of entering or specifying an intent term, or invoking the associated function. Also with the suggested intents are potential modifiers or targets that can help to teach how to best utilize these intents. So a suggested query might be "NEWS about" instead of just "NEWS" to give a better idea about how the intent will be interpreted, as well as how to best use the intent. While words such as "in" and "for" may not have much impact in some embodiments, they may be given a substantial amount of consideration in others. For example, "NEWS for parents" might return a completely different set of results (i.e., tips on raising children) than "NEWS about parents" (i.e., news about people who have children) as the intent of the query will be interpreted differently based on the modifiers, prepositions, or other such terms in the query. In the example 280 of FIG. 2E, there may be various intents 284 suggested for a query that a user can choose by selecting, dragging and dropping, or performing another such action. Additional suggestions can then potentially be made based at least in part upon the selection(s).

Figure 2F:
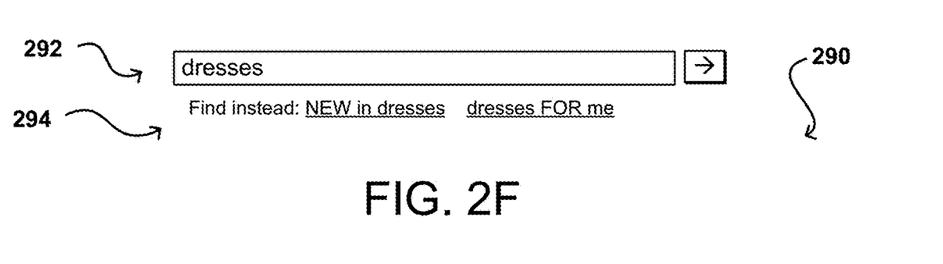

In the example 290 of FIG. 2F, a user might submit a query using any of the approaches discussed above, or another such approach, and may receive in return a set of search results. It might be the case, however, that the results returned did not include or represent the actual intent of the user. It might alternatively be the case that the results matched the user intent, but the user would like to receive slightly different results or other related content. In this example, one or more search query suggestions 294 can be displayed that can be selected (or otherwise selected or entered) by the user. The suggestions can relate in some way to the prior query 292, but can offer additional filters, context, or options that may not have been present in the prior query. In this example, each suggestion includes an intent term that can be used to obtain a different set of results. In addition to providing an easy mechanism for a user to refine the search query, such an approach can also help to teach or inform the user of intent terms or other mechanisms that can be used to search for different types or collections of content.

The ability to utilize intents can help users who typically start searches for content by typing in various keyword combinations, which are then matched to relevant metadata or index entries. Simple word matches can lose any context or intent that the user has, and thus can provide results that are not as accurate or relevant as desired. The ability to utilize intents can help to understand what the user is really looking for, interested in, or otherwise thinking when submitting the query. Intent terms can help to provide useful phrases or keyword that users can try in a search box, or other such interface element, to obtain more relevant content, as well as to obtain content from different sources and of different types. A user might then also discover new sources or types of information that are desirable to the user. In some embodiments natural language processing (NLP) can be used to better understand the intent of the query, based upon the modifiers and other terms and patterns presented in a query. Users can take advantage of the improved understanding to obtain new types of content, and providers can take advantage by providing additional intents that drive users to specific types or sources of relevant content. There can be various types of queries with intent terms utilized, as may include "shoes FOR ME," "WHY tankless water heaters," "TRENDING in fashion," "BEST movies to binge watch," "GIFT for my spouse," "DIY bike racks," and the like. A user can type a query directly into the search field or select intent terms prompted through the interface. The interface can visually differentiate terms interpreted as intent terms, indicating how that query will be interpreted by the relevant search engine. The suggestions can teach the users to modify the above queries based on the prompted intents, to queries such as "NEW movies," "dresses FOR ME," "WHY smart home," "TRENDING in home decor," "BEST music for running," "GIFT for college student," or "DIY bike racks," among others.

The suggestions can help teach users about types of intents that the users might also not have realized are available. For example, online retailers may have an extremely large set of product offerings, and content providers may have an extremely large set of available content, that are difficult for a user to search based on the sheer volume. A user may often have to already have a relatively specific idea of an intended product or type of content in order to find anything useful or relevant before becoming frustrated. In contrast, smaller specialty stores or specific types of content providers may carry a smaller selection with a deliberate or specific point of view or target audience, etc. For example, a user might have a pretty good idea of what types of items to expect if shopping in Brand 1 versus Brand 1, or Brand A versus Brand B. Since smaller stores carry fewer products with similar styles or price points, it can be easier for customers to shop because they know which of these stores match their tastes and budgets.

In at least some embodiments, intents can be provided that enable users to obtain the similar type of results from a larger and more varied provider. For example, a user could enter a query such as "jewelry LIKE Brand A" to obtain results for a set of items that are similar to jewelry offered by Brand A. The similarity could be based on any relevant criterion, such as style, price, designer, user reviews, and the like. In some embodiments, one or more persons can manually tag items that are similar to items offered by Brand A. A database, such as a trademark database, can be used to both determine the target (e.g., Brand A) and determine relevant content (e.g., use a description obtained from the goods and services of the mark to perform a semantic search of a product catalog). The relevant database may be determined based on the user's location (e.g., EU trademark database vs. US trademark database) or the user's implicit or explicit preferences, among other such options.

In other embodiments, various content sources such as online resellers, digital catalogs, and other sources can be crawled to obtain information about items offered by Brand A and other retailers, which then can be analyzed for purposes of locating similar or relevant items. The relevant or related items can be determined using various similarity criteria, or can be determined using machine learning that is trained on items available from specific merchants or providers, among other such options. The data set can be updated as more information is available, and the neural networks or other machine learning further trained using that data. In some embodiments content determined to be relevant can be tagged as such to simplify future content searches. Users can potentially have the option to agree or disagree with the similarity to help train the models and improve the results, although similarity of style can be subjective and a consensus of users may be required for a change or complete removal of such an association. Other example queries for such purposes include "dresses LIKE Brand A," "furniture LIKE Brand B," and "gear LIKE Brand C", among others. As above, users can also change the query for the store, or retype the store name to search for items similar to a different source. For example customers could change the above queries to these "dresses LIKE Brand D," "jewelry LIKE Brand E," "furniture LIKE Brand F," or "gear LIKE Brand G," or change the queries to "shoes LIKE Brand B," "engagement rings LIKE Brand T," "dinnerware LIKE Brand C," or "coats LIKE Brand V." In some instances the keywords such as "tiffany" may have multiple meanings or uses, so context and machine learning may need to be used, among other such possibilities, to determine the intent, target, and/or context for the query and various terms contained therein.

Advantages of intent-based queries is that users can not only specify targets or types of content, but can also express an interest to learn about specific topics or types of content using various types of information from various sources. For electronic retailers or content providers, this enhanced experience may cause customers to frequent the site or access the content, which can potentially improve conversions, lead to increased revenue, or otherwise drive traffic to the provider. Ranking and relevance models can be adjusted as appropriate to account for the intent when ranking and selecting different types of content from various sources. Further, approaches in various embodiments can attempt to generate various intent queries that will be able to obtain the type of content desired from various sources. For example, if a submitted query is "NEW in fashion" then a query to a digital content provider might be "fashion programming between date( ) and date( )-6" which would return content determined to be related to the keyword fashion that was first available or provided in the last week. A similar type of query might be submitted to a news organization, to obtain articles related to fashion over the last week or day. A different type of intent query might be generated for upcoming events, which might specify a particular date range for upcoming fashion shows. For an electronic marketplace, the query might specify one or more fashion categories that are ranked by product release dates. Various other intent queries can be generated as appropriate for the various content sources.

There can also be variants of the skills provided or learned over time. For example, "NEW" might be treated the same as "NEW in" or "CURRENT" or "NEW for" or "LATEST," etc. In some embodiments, machine learning may monitor the interactions of users with results for each of these intent terms to learn subtle differences in the intent over time. In other embodiments an attempt may be made to group variations of intent terms in order to simplify the search process, such as where tags or metadata are used to assist with the search process. Queries can also be analyzed using natural language processing and machine learning to learn new intent terms over time. In some embodiments users may also be able to suggest new intent terms for consideration. A list or set of other intents or queries can also be displayed with search results to provide a user with alternative results that may more closely match the actual subjective intent of the user. Further, the interactions of users with the various types of content can help to determine which sources or types of content are most relevant for various intents or types of users. The interactions can also help to learn what users mean by the same terms for different intents or queries. For example, "NEW in fashion" might be on a different timetable than "NEW in world news" or "NEW in automobiles." Similarly, "NEW" might mean new from a sheer time perspective or new to a particular user, in that the user has not seen that content before. The experience can thus become more customized over time and the determinations of user intent become more accurate. In addition to content obtained from various sources, there can also be various widgets, windows, ads, or other supplemental content selected based at least in part on the determined intent.

Figure 3A:
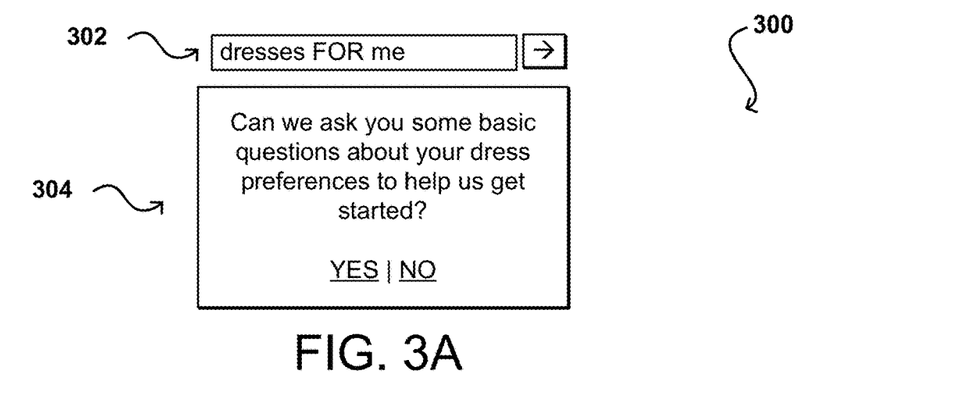
FIGS. 3A, 3B, 3C, and 3D illustrate example questions that can be provided to obtain information to assist with locating content for a type of intent that can be utilized in accordance with various embodiments.
Figure 3B:
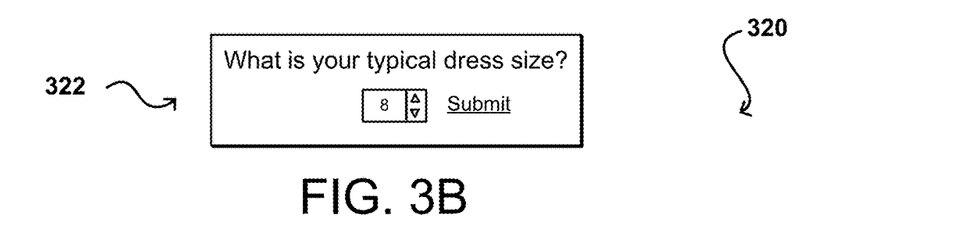

As mentioned, in many embodiments the detection of a query with an intent term can cause a corresponding function to be determined. This predefined function can perform tasks such as to determine relevant sources, as well as to generate one or more intent queries to be submitted against those sources. In some embodiments the function can attempt to utilize information about the user or source of the query in order to generate the appropriate intent queries. As illustrated in FIG. 3A, a query 302 has been submitted into a search box or other such mechanism. Upon determining that specific user information is useful for the corresponding function, but that the information is not currently available or up to date, an interface element 304 might be displayed to request permission to obtain the information from the user, or prompt the user to provide the information, among other such options. In at least some embodiments, the questions asked or displayed can be determined dynamically. For example, the type of information available, as well as responses to prior questions, can determine which questions (or possible answers) to display to the user. For example, as illustrated in the display 320 of FIG. 3B a basic question displayed through an element 322 for a "dresses" query can ask the user's typical size for that type of item. This might be a basic question that is asked to all users for such a target or type of intent.

Figure 3C:
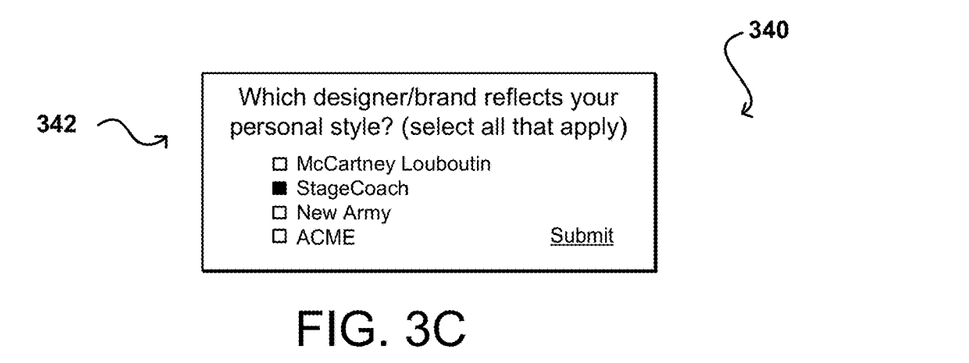
Figure 3D:
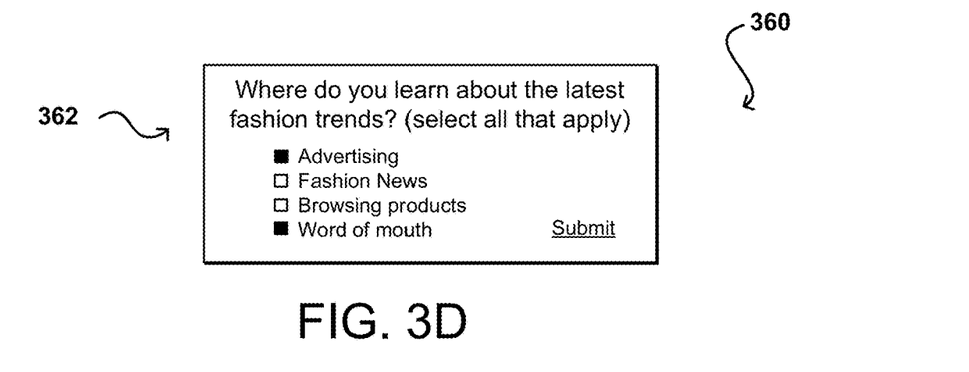

It is possible that certain designers have certain sizes that they offer, or do not offer, in dresses. Thus, a next question according to the function logic might relate to the designers or brands that represent the user's style. This can be used to determine types of dresses or content to suggest for that user. In this example the question may be a standard question for this type of intent, but the proposed answers might be determined based upon known information, such as designers or brands that offer dresses in the user's size. For example, the proposed answers or responses in the element 342 displayed in the situation 340 of FIG. 3C can be determined dynamically based at least in part upon the user's size information. Sometimes the questions themselves may depend at least in part upon the previously obtained data. For example, in the example situation 360 of FIG. 3D the user is asked through an element 362 to provide information about how the user keeps up on fashion trends. If, however, the user indicated that they do not have designer or trend interests, then the user might not be asked this question or might be asked a different question. For example, the user might be asked a more general question about whether they are interested in fashion trends or if they would like to be presented with fashion information. There may be various rules, guidelines, decision trees, or other logic used in various embodiments to determine which questions to ask a particular user for a particular type of intent and/or target. Other information can be considered as well, as may include the season, geographical location, etc.

Figure 4:
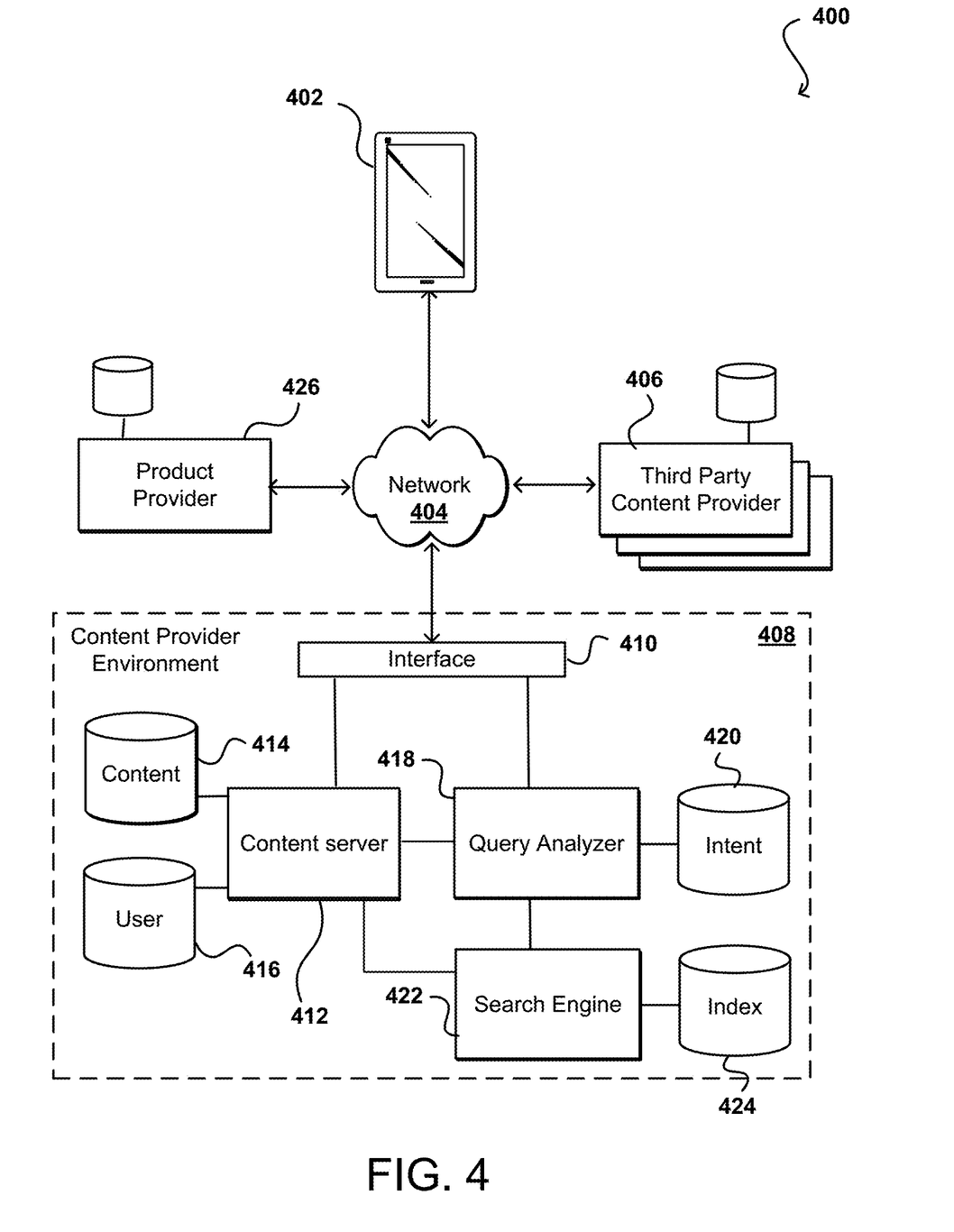
FIG. 4 illustrates an example system that can be used to determine content to provide for viewing by a user that can be utilized in accordance with various embodiments.

FIG. 4 illustrates an example environment 400 that can be used to implement aspects in accordance with various embodiments. In FIG. 4, a client computing device 402 can submit a request for content across at least one network 404 to be received by a content provider environment 408. In this example, a call received to the content provider environment 408 can be received by an interface layer 410 of the environment. As known for network environments, the interface layer can include components such as interfaces (e.g., APIs), load balancers, request and/or data routers, and the like. If the request is a request for content, such as for content for a page to be displayed in an application or browser, information for the request can be directed to one or more content servers 412, which can obtain the content from a content data store 414 or other such repository to be sent back across the network(s) to the computing device. In some embodiments, information for the request might also be compared against user data in a user data store 416 or other such location do determine, for example, whether the user has access rights to that content. In one example, the content can include a plurality of images to be displayed as part of a set of search results or set of potential items of interest, although various other types of content and uses for images can be utilized as well within the scope of the various embodiments.

In some cases, a request received to the content provider environment 408 might be from another entity, such as a third party content provider 406. As discussed previously, such providers may provide content, such as images, video, or articles, to be displayed to users as part of, or along with, the served content. The interface layer can determine the type of request and cause information to be forwarded to a content server 412, or other such component or service, which in some embodiments can cause the content, or information for the content such as links and keywords, to be stored to a content data store 414 or other appropriate location. Any information associated with the content, such as a description or identification of one or more features of the items represented in the content, can also be provided and stored in the data store. In at least some embodiments, information about features of the items can be determined through components of the content provider environment, or otherwise determined.

In this example, the request from the client device 402 can include a search query to be used to locate specific content, or results for various content, stored by the content provider or available from a third party provider 406, among other such options. The query information can be directed to a query analyzer 418, which is configured to determine whether one or more intent terms are contained in the query. In some embodiments, a query analyzer can analyze the information in the query to attempt to suggest intent terms to a user of the client device 402 as well as discussed herein. The query analyzer 418 in some embodiments can compare the query against query terms, patterns, or other criteria stored to an intent repository 420 or other such location. The query analyzer, upon detecting one or more intent terms, can utilize the intent information to generate one or more intent queries that can be executed against one or more content sources, such as indexes of various databases. If no intent terms are detected, the query can be processed using conventional search approaches or other approaches discussed and suggested herein. The one or more queries can then be passed to at least one search engine 422, which can be internal or external to the environment 408. The search engine can execute the queries against one or more indexes 424 or other data sources, which may also be internal or external to the environment. The results can be aggregated by the search engine 422 and passed along to the content server 412, which can select and format content to be provided to the client device 402. As mentioned, this may include not only search results for products or webpages, but also news articles, movies, podcasts, and other types of content that might be of interest to the user that is determine to be relevant based at least in part upon the determined intent. Providing the results can include, for example, generating HTML to be rendered in a browser application on the client device to enable content to be displayed in an arrangement based at least in part upon the determined ranking. In some embodiments a diversity component can be part of, or installed in, the content server, while in other embodiments it can be a separate component or service that may be called by the content server, among other such options. A diversity component might be used to ensure that different types of content are returned for an intent, even if content of a single type is determined to be most relevant to the query.

Figure 5:
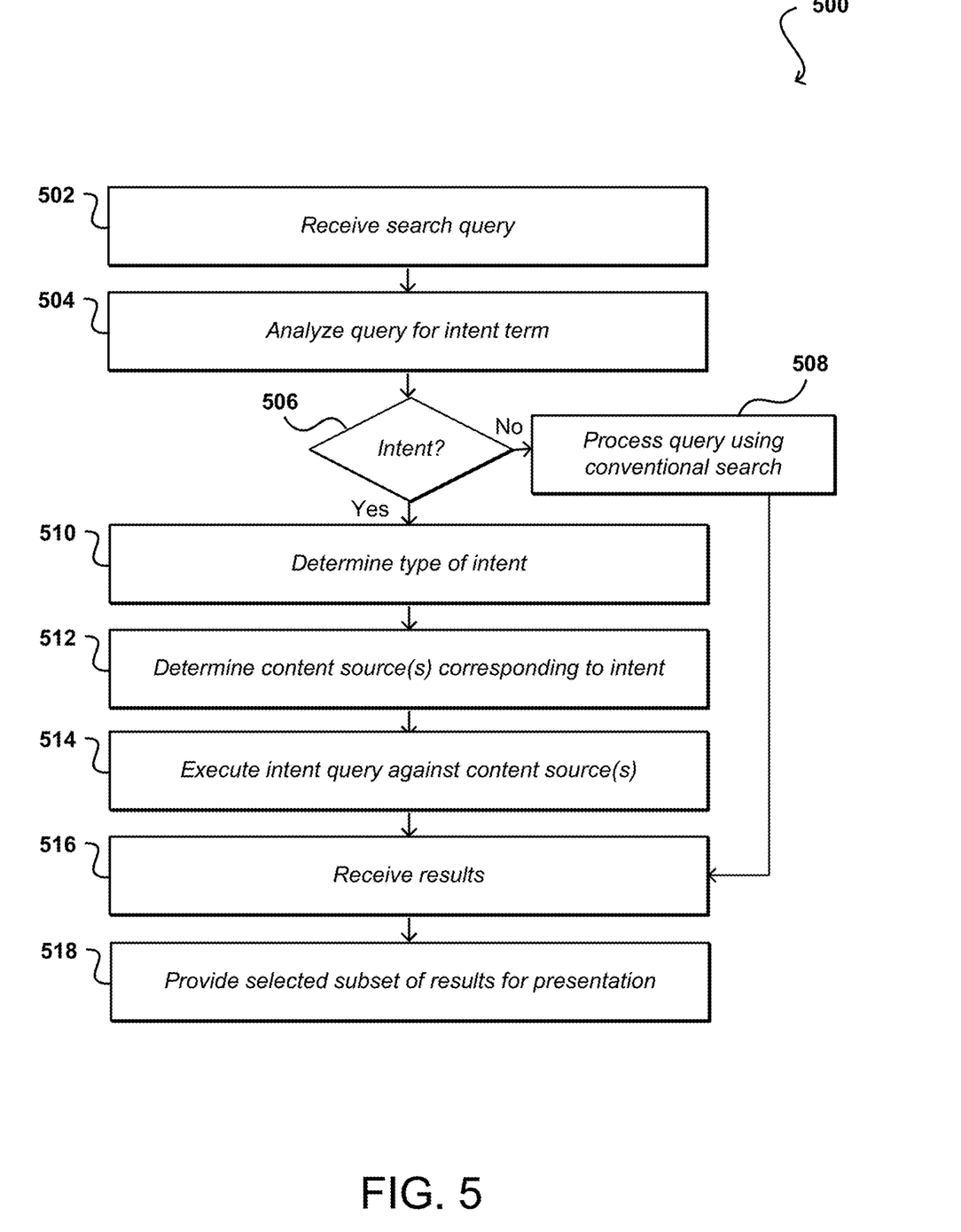
FIG. 5 illustrates an example process for locating content by intent queries that can be utilized in accordance with various embodiments.

FIG. 5 illustrates an example process 500 for obtaining content using intent terms and patterns that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a search query 502 is received on behalf of a user, such as may have been entered into a search interface of an application executing on a client device. The query can be analyzed 504 to attempt to determine the presence of an intent term. As mentioned, this can include searching for one of a set of intent terms formatted in a specific way, or may involve using natural language processing or machine learning to attempt to determine whether an intent is implicit in the query. While examples of colored fonts or all capital letters are described for purposes of conveying an intent term to a user, different approaches may be used to indicate intent terms to a search server, such as to include a prefix "IN/" or place the term between specified characters, among other such options. If no intent term is determined 506 to be included in the query, or no intent implied, then the query can be processed 508 using a conventional search approach or other such approach as discussed elsewhere herein. If an intent is detected, a type of intent can be determined 510. As mentioned, this can be based upon any of a number of different factors, such as the inclusion of a target or modifier, a type of page into which the search query was entered, information about the user associated with the query, and the like. Based at least in part upon the type of intent, one or more content sources can be determined 512, as may include search indexes or repositories for audio, video, text, web, or other types of content of various topics. At least one intent query can then be executed 514 against each (or a subset) of the determined sources, with relevant results being subsequently received 516 from those sources as known for executing queries against a data source and receiving search results therefrom. A selected subset of results, such as a set of highest ranked results of a plurality of different types, can be provided 518 for presentation on the associated or targeted device. In some embodiments additional or alternative intent terms or queries can be provided with the search results in order to enable the user to receive a new or updated set of search results that may be of more interest to the user.

Figure 6:
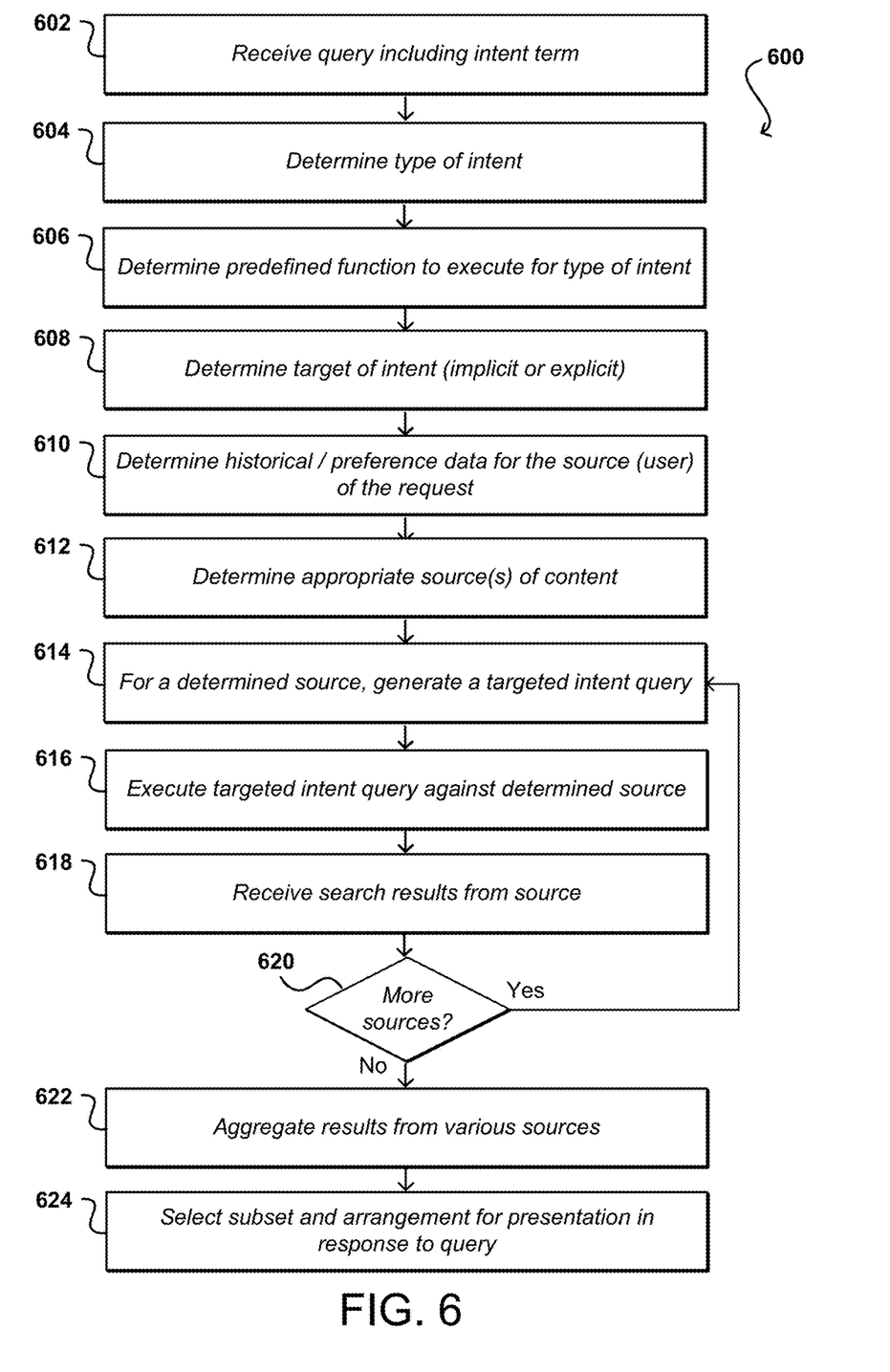
FIG. 6 illustrates an example process for generating intent queries to be submitted against various content sources that can be utilized in accordance with various embodiments.

FIG. 6 illustrates an example process 600 for executing intent queries to obtain relevant content that can be utilized in accordance with various embodiments. In this example, a query including an intent term is received 602 for obtaining relevant content. The query can be analyzed to determine 604 a type of intent, such as where various terms or variations may be mapped to a specific intent type, where the types might correspond to new or recent content, content similar to that offered from a specific provider, content matching a person's style, and the like. A target of the intent can also be determined 606, where that target can be implicit or explicit. For example, a query might say "NEW in fashion" where fashion is an explicit target, while "UPCOMING" if entered into a shoe retailer site might have a target of "shoes" or "retail products offered by this source" determined to be the implied target. Any relevant historical or preference data for the source of the request can also be determined 608, such as past purchase or viewing behavior of a user, pages accessed on a device, etc. Based at least in part upon any or all of this information, one or more content sources can be determined. For example, an intent to obtain media results for fashion may be executed against very different sources than an intent to obtain news articles relating to a specific event, or electronics capable of performing a specific function.

For each determined source, a targeted intent query can be generated 612. For example, an intent query for new fashion content to be delivered to a media provider might indicate to send media content files that are relevant to fashion and were first posted within the last week. For news articles, the targeted query might indicate to provide results related to fashion that were posted today. For new fashion products, the query might ask for fashion items that are currently available or first made available in the last three months. Different sources may utilize different query formats or styles as well. The targeted query can be executed 614 against the determined source and search results received 618 back from that source. The process can continue if it is determined 618 there are more sources, although in many instances the queries will be executed in parallel. After the results are received from the sources those results can be aggregated 620 and a subset of those results 622 selected and arranged for presentation in response to the query. As mentioned, in some embodiments a diversity component or criterion may be applied such that results of different types are provided for display as may be determined based at least in part upon the type of intent. In some embodiments one or more entities may also have bid or paid for preferential treatment, or a specific type or level of treatment, with respect to an intent term or type of intent, which can cause at least some of the results for that entity to be featured or otherwise preferentially presented with respect to the other relevant results. In some embodiments a bidding entity may also be provided some editorial control over the types or sources of content returned to the user for a specific intent term of type of intent. The entity may also have some input or control in some embodiments over the intent function(s) to be utilized.

Figure 7:
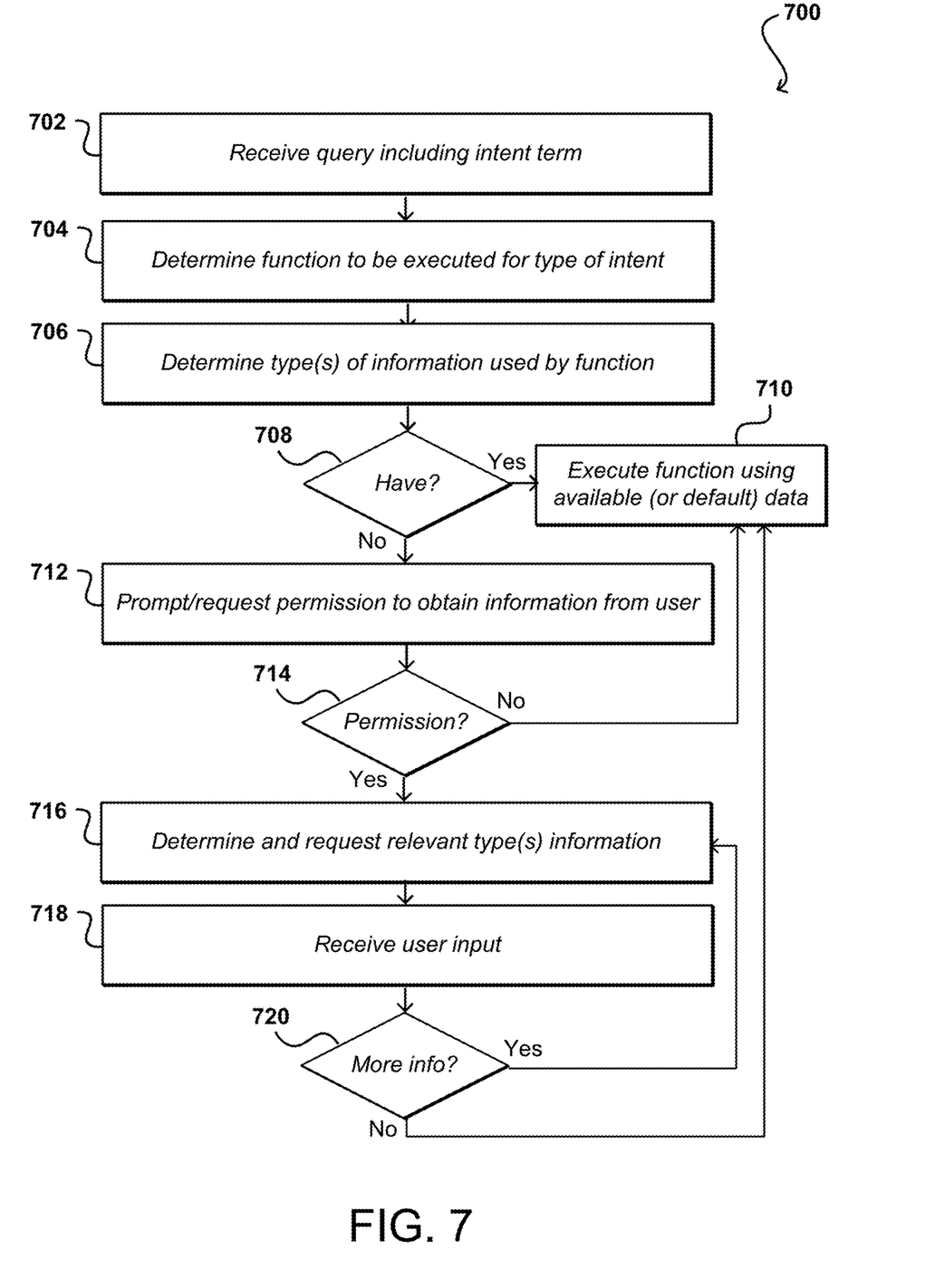
FIG. 7 illustrates an example process for obtaining information for an intent function that can be utilized in accordance with various embodiments.

FIG. 7 illustrates an example process 700 for obtaining information for an intent function that can be utilized in accordance with various embodiments. In this example, a query is received 702 that includes an intent term. A function to be executed for that type of intent is determined 704, such as is discussed with respect to the process of FIG. 6 and elsewhere herein. Once a function for the type of intent, or an intent function, is determined, another determination can be made 706 as to the type(s) of information used by the function. This might include, for example, basic or required information, as well as useful information that may improve results, among other such options. A determination can be made 708 as to whether that type of information is known or has been obtained for the user, and if so then the function can be executed 710 using the known and relevant information. If some or all of the information is not currently known or obtainable for the user, a UI element or other mechanism can be used to prompt 712 the user to provide the information or request permission to obtain that information for the user. If it is determined 714 that permission is not obtained or the user does not respond favorably to the prompt, then the function can be executed 710 using the available information or, in some embodiments, default information if no specific personalized information is known or available.

If the user provides permission or responds favorably to the prompt, one or more relevant types of information can be determined 716 to attempt to obtain from the user. As mentioned, a question, option, or other mechanism can be provided to the user through an interface element (i.e., visual, audible, or gesture) to enable the user to provide or select a response. User input can be received 718 for the question, either providing the requested information, declining to provide the information, or otherwise. A determination can be made 720 as to whether additional information is to be obtained, and if so the process can continue, such as by providing another question or request for the user. As mentioned, in some embodiments the determination may be based at least in part upon the prior user response(s). If at least sufficient or minimum information has been obtained, in at least some embodiments, then the function can be executed using that information. Otherwise, the process can continue to attempt to obtain additional information. The process can continue in some embodiments until at least a threshold amount of data is obtained or the user indicates (explicitly or implicitly) that the user is unwilling (or otherwise does not want) to provide additional information, at which point the function can be executed to locate the most relevant content based on the information that has been obtained. Various other criteria or thresholds can be used as well within the scope of the various embodiments.

Figure 8:
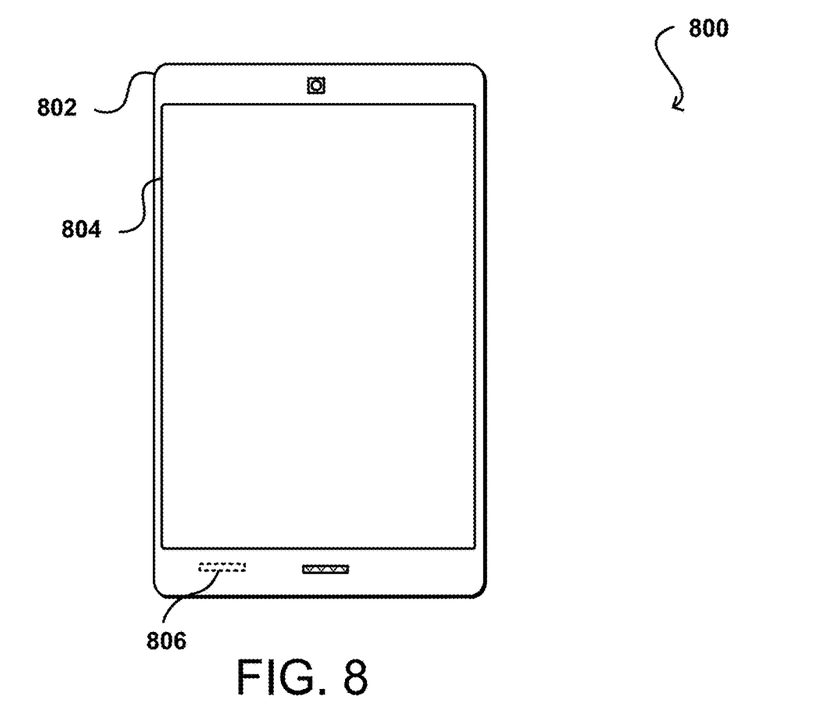
FIG. 8 illustrates an example computing device that can be utilized in accordance with various embodiments.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 9:
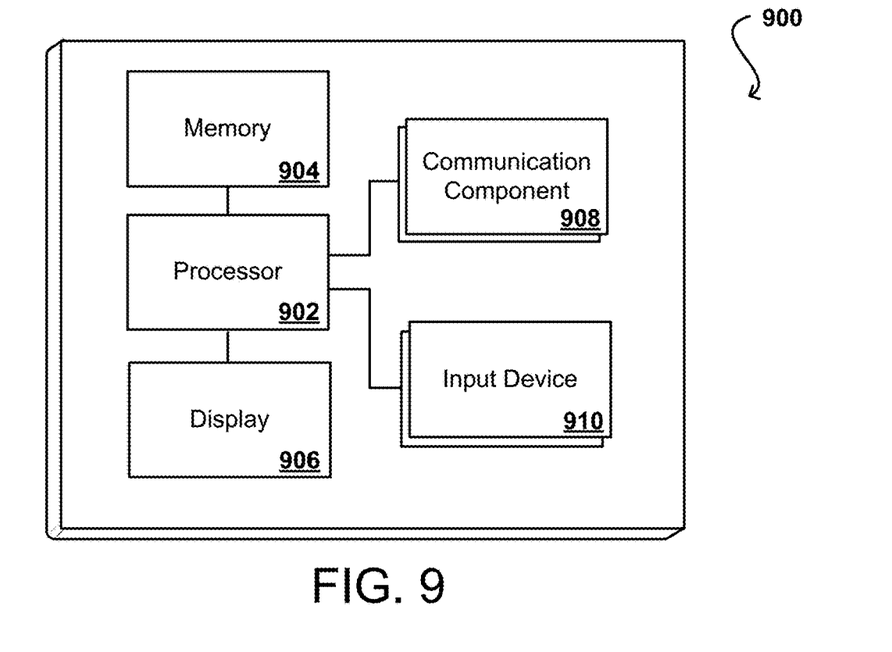
FIG. 9 illustrates an example configuration of components of a computing device, such as the device illustrated in FIG. 6.

In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like. FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may enabled wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
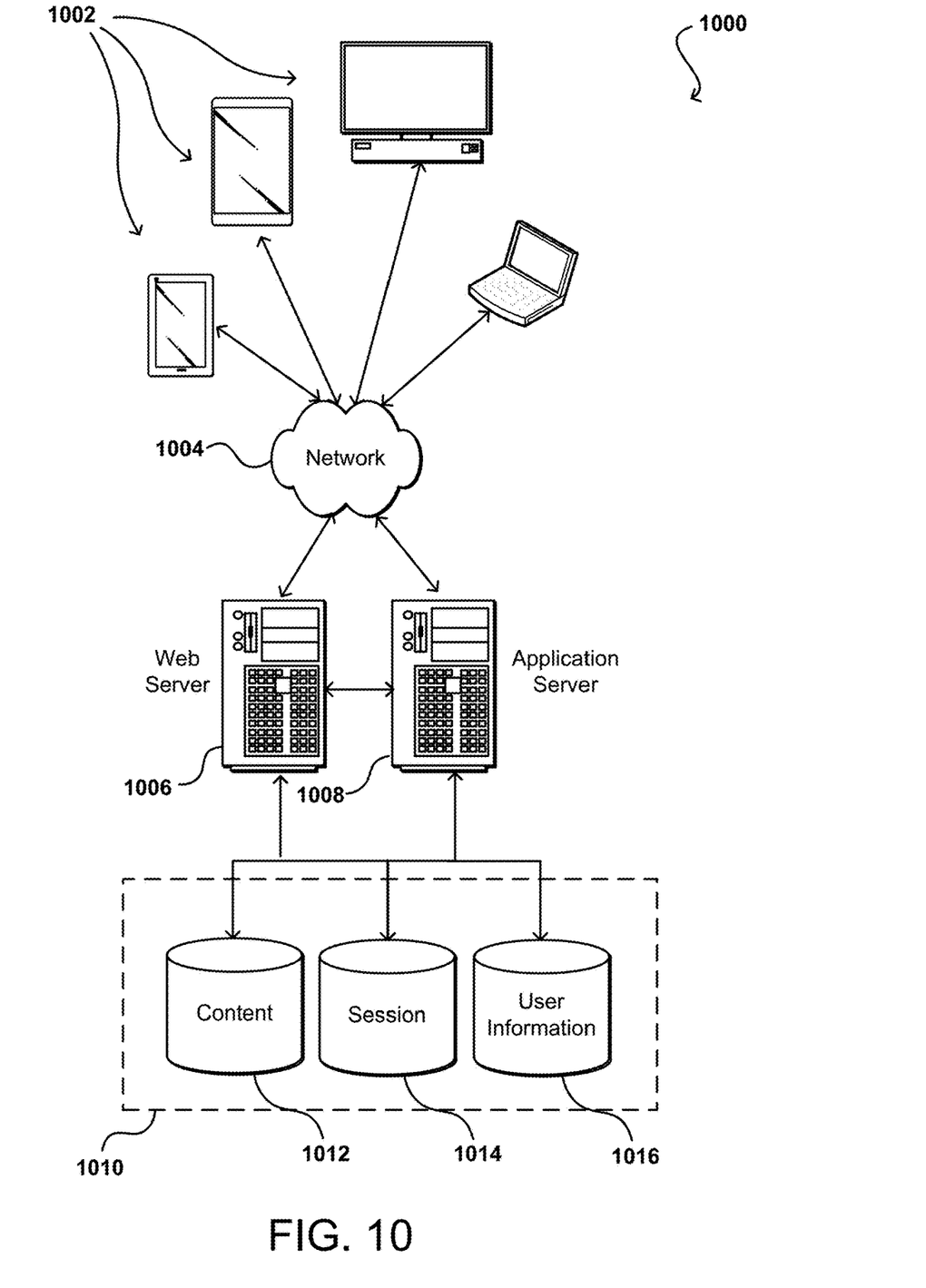
FIG. 10 illustrates an example environment in which aspects of the various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a plurality of intent terms, wherein each intent term identifies a context for a search query, and wherein each context represents at least one of a time period or a quality metric;
   receiving, to a search query element of an interface, a search query with a plurality of search terms including at least one keyword;
   determining, based at least in part upon the at least one keyword and an arrangement of the at least one keyword in the search query, that the at least one keyword is an intent term of the plurality of intent terms and is related to one or more of the plurality of search terms;
   modifying a displayed appearance of the intent term through the interface, indicating that the corresponding keyword is identified as an intent term;
   providing a plurality of suggested search queries including the search query;
   receiving selection of the search query including the intent term;
   determining a predefined function corresponding to a type of the intent term;
   identifying, through execution of the predefined function, a set of data sources associated with the predefined function;
   generating, according to the predefined function, one or more intent queries to be executed against the set of data sources, the intent queries generated to obtain specific types of results determined at least in part by the intent term and a target of the intent term;
   obtaining, from the set of data sources in response to executing the intent queries, a set of search results determined to be relevant, wherein the search results are associated with the at least one time period or quality metric; and
   providing at least a subset of the search results for display in response to the search query.

2. The computer-implemented method of claim 1, further comprising:
   determining the intent term in the at least one keyword based at least in part upon the intent term being included in a set of intent terms of at least one intent type; and
   generating the one or more intent queries further based upon the intent type of the intent term.

3. The computer-implemented method of claim 1, further comprising:
   determining that the target of the intent term is a content provider;
   determining aspects of the content provided by the content provider; and
   determining at least a subset of the search results based upon the search results being relevant to the determined aspects of the content.

4. The computer-implemented method of claim 1, further comprising:
   modifying the displayed appearance of the intent term by at least one of adjusting a font, character size, boldness, italics state, color, image, animation, representative emoji, or location of the intent term in the search query element.

5. The computer-implemented method of claim 1, further comprising:
   displaying one or more related intent terms through the interface before executing the search query including the intent term, wherein a new intent term is capable of being selected before the search query is executed.

6. A computer-implemented method, comprising:
   determining a plurality of intent terms, wherein each intent term identifies a context for a search query, and wherein each context represents at least one of a time period or a quality metric;
   receiving one or more characters to a search element of an interface;
   determining at least one intent term of the plurality of intent terms corresponding to the one or more characters;
   providing a selectable option corresponding to the intent term;
   receiving selection of the intent term, the selection causing the intent term to be displayed in the search element with a specified appearance identifying the intent term;
   providing a plurality of suggested search queries, individuals of the suggested search queries including the intent term;
   receiving a selection of one of the search queries of the plurality of suggested search queries; and
   causing the selected search query, including the intent term, to be executed against at least one search index, wherein a type of result to be returned is determinable based at least in part upon a relevance of the result to a target of the intent term determined based at least in part upon an intent type of the intent term, and wherein the type of result to be returned is associated with the at least one time period or quality metric.

7. The computer-implemented method of claim 6, further comprising:
   generating at least one targeted intent query based at least in part upon the intent type, wherein the type of result to be returned is specified to a respective search index against which the targeted intent query is executed.

8. The computer-implemented method of claim 6, further comprising:
   receiving one or more additional characters into the search element;

determining, with at least a minimum confidence, that the one or more additional characters corresponds to a second intent term; and causing the one or more additional characters to automatically be displayed with the specified appearance indicating that the one or more additional characters correspond to an intent term.

9. The computer-implemented method of claim 6, further comprising:

determining the target of the intent term, the target being included in the search query or determinable from the search query using natural language processing.

10. The computer-implemented method of claim 9, further comprising:

further determining the target based at least in part upon at least one of a search category, a type of interface, user information, or a search context.

11. The computer-implemented method of claim 6, further comprising:

determining that the type of intent relates to obtaining results similar to content offered by a provider specified by the target;

determining aspects of the content offered by the provider; and locating the results determined to be relevant to the aspects of the content.

12. The computer-implemented method of claim 11, further comprising:

analyzing one or more content sources storing information about the content offered by the provider; and generating the aspects to be used to locate the results, the aspects being stored for subsequent content determinations.

13. The computer-implemented method of claim 6, further comprising:

providing for display one or more alternative intent terms, enabling a different type of intent to be associated with the search query.

14. The computer-implemented method of claim 6, further comprising:

causing search results for the search query to relate to at least two content types satisfying a diversity criterion.

15. A system, comprising:

at least one processor; and memory storing instructions that, when executed by the at least one processor, cause the system to:

determine a plurality of intent terms, wherein each intent term identifies a context for a search query, and wherein each context represents at least one of a time period or a comparison associated with results of the query;

receive one or more characters to a search element of an interface;

determine at least one intent term of the plurality of intent terms corresponding to the one or more characters;

generate at least one intent query based at least in part on the at least one intent term;

provide a plurality of suggested search queries, including the at least one intent query;

receive a selection of one of the intent queries;

execute the selected intent query against at least one search index; and select at least one type of result of executing the at least one intent query to be returned through the interface, wherein the type of result is associated with the at least one time period or comparison.

16. The system of claim 15, wherein the instructions when executed further cause the system to:

generate one or more prompts for user information, the user information usable by the intent function in generating the at least one intent query.

17. The system of claim 15, wherein the instructions when executed further cause the system to:

receive one or more additional characters into the search element;

determine, with at least a minimum confidence, that the one or more additional characters correspond to a second intent term; and provide for display a selectable option to enable the second intent term to be included in the search query.

18. The system of claim 15, wherein the instructions when executed further cause the system to:

determine the target of the intent term, the target being included in the search query or determinable from the search query using natural language processing.

19. The system of claim 15, wherein the instructions when executed further cause the system to:

determine that the type of intent relates to locating results related to content offered by a provider specified by the target;

determine aspects of the content offered by the provider; and locate the results determined to be relevant to the aspects of the content.

20. The system of claim 15, wherein the instructions when executed further cause the system to:

modify the displayed appearance of the intent term by at least one of adjusting a font, character size, boldness, italics state, color, image, animation, representative emoji, or location of the intent term in the search query element.

* * * * *